Feb. 4, 1936.  W. H. TRY  2,029,399
GEAR CUTTER
Filed May 19, 1933
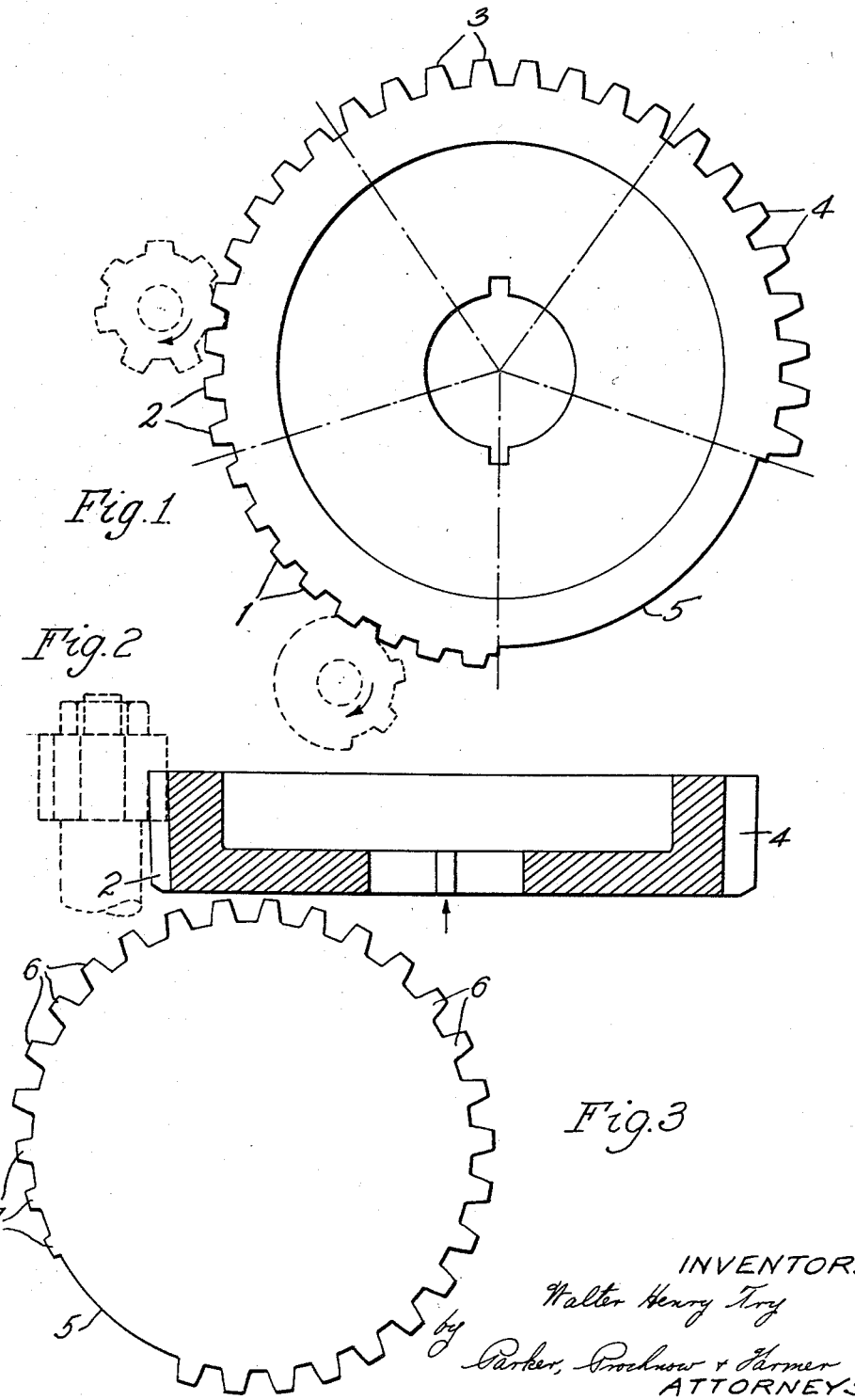
INVENTOR.
Walter Henry Try
by Parker, Prochnow & Harmer
ATTORNEYS.

Patented Feb. 4, 1936

2,029,399

UNITED STATES PATENT OFFICE 2,029,399

GEAR CUTTER

Walter Henry Try, Staines, England, assignor to William E. Sykes, Buffalo, N. Y.

Application May 19, 1933, Serial No. 671,874
In Great Britain June 1, 1932

2 Claims. (Cl. 29—103)

This invention relates to gear cutting tools of the gear wheel or pinion type which are provided with peripheral cutting teeth and operate on the molding generating system of cutting, in which the tool and the gear blank rotate relatively to each other like two intermeshing gears, thus placing successive teeth or portions of the tool in cutting relation to successive portions of the blank, and there is also an axial movement of the tool relatively to the blank or vice versa, in making the cuts.

In the known gear cutting machines utilizing this principle, in addition to the above mentioned rotary and axial movements, it is also necessary to produce a feeding or relative approaching movement between the tool and the work, and an infeed mechanism of one sort or another is required to move either the tool or the work, or both for this purpose.

One object of the invention is to provide a gear cutting tool of the type mentioned which obviates the necessity for any infeed motion of either the cutting tool or the work, or any change in the distance apart of the axes of the tool and work, after the tool and work have been once set or adjusted to proper position for commencing the cutting operation.

In order to attain this object, a cutting tool is provided having peripheral cutting teeth concentric with the axis of the tool and interrupted or preceded by a peripheral gap, depression or blank space, in which gap or space the gear blank is adapted to be set or adjusted toward the axis of the tool to a position such that the teeth of the tool can cut into the blank to the full ultimate depth intended and thus complete the cuts in the blank during the aforesaid relative rotary and axial cutting movements of the blank and tool without any infeed movement or reduction in distance between the axes of the tool and blank during the cutting operation.

Another object of the invention is to provide a tool which will perform on a gear blank two or more of the several cutting operations or steps, such as roughing, finishing and shaving, which usually require each a separate tool and a separate machine.

This may be accomplished according to the present invention by providing on the same tool a number of sets of teeth of different forms or proportions adapted to perform such different cutting steps. Preferably the cutter is provided with teeth of all the different forms or proportions necessary for the production of a finished gear from a turned blank and preferably during a single revolution of the tool. The peripheral gap or blank space, one or more of which may be left in the cutting tool between the sets of teeth, allows the unloading of finished gears and the loading of fresh blank.

Yet another object of the invention is to provide a cutting tool having the other features of improvement and advantages hereinafter described and set forth in the claims.

In the accompanying drawing:

Fig. 1 is a plan view showing a gear cutting tool embodying the invention and showing by broken lines the cutting relation thereto of a gear blank in different stages of completion.

Fig. 2 is an axial section of the tool, indicating by broken lines a gear blank in cutting relation thereto.

Fig. 3 is a diagrammatic plan view illustrating one of the various modifications of the tool within the scope of the invention.

The cutter as shown in Figs. 1 and 2 is of approximately five times the diameter of the finished work and is provided on its periphery with four sets of teeth, 1, 2, 3 and 4, which are arranged in the order in which they are required, and are interrupted by a peripheral gap or blank space 5. The teeth 1 are suitably formed or proportioned to effect the first rough cutting, the teeth 2 the second rough cutting, the teeth 3 the finishing cutting and the teeth 4 the shaving of the work. The circumferential length of each of the sets of teeth is equal to or slightly greater than the periphery of the work, so that one operation will be carried out for each revolution of the work spindle, or in other words, there are as many or more teeth in each set on the cutter as there are on the finished work. As the sets of teeth are continuous around the periphery of the cutter and are arranged in the order in which they are required, the completion of each operation will be followed immediately and automatically by the beginning of the next operation, until the gear is completed and the blank space 5 is reached. The finished gear is then unloaded from the work spindle and a fresh blank loaded. The whole series of operations from turned blank to finished gear is thus completed during one revolution of the tool. The blank space 5 is shown as of the same length as each of the sets of teeth; it may, however, be made considerably shorter.

A cutter in accordance with the invention may be of any suitable construction with either integral or inserted teeth, or sets of teeth. The teeth may be either straight or helical and of any profile or contour adapted for the moulding generating method of cutting. In the embodiment of the invention shown in Fig. 1, for example, all of the teeth are of uniform pitch and of uniform width, but the teeth of each set are longer, or of greater radial depth, than the teeth of the next preceding set, so that each succeeding set of teeth will cut deeper into the blank. Manifestly, however, instead of thus forming or proportioning the teeth, they could be of uniform pitch and length but of increasing widths in succeeding sets so that the teeth of one set will increase the widths of the tooth spaces cut in the gear blank by a preceding set. The cutter is suitable for use on all forms of machines using a cutting tool of gear wheel or pinion formation in which the cutting is effected by a relative reciprocation between the cutter and the work in an axial direction relative to the work. It is immaterial to the invention whether the work is withheld from axial movement and the cutter reciprocates or vice versa; the plane of motion is also immaterial.

It is not necessary to this invention that the cutting tool shall have a plurality of sets of different teeth as above described, or that all the cutting operations from the work blank to the finished gear be carried out by the same cutting tool, or that all of them be performed by a cutting tool according to this invention. One operation only may be performed by a cutting tool according to this invention and prior or subsequent operations if or when necessary, may be performed by another cutting tool made according to this invention, or by a cutting tool or cutting tools of other suitable design or designs.

When one cutting operation only is performed by a tool according to this invention, there need be only one full set of cutting teeth 6 and a few teeth 7, of shortened depth or other smaller dimension next to the blank space, as shown in Fig. 3. In this method of applying the invention, the primary advantage over known cutting tools of the gear or pinion type is that no relative movement in a direction to move the axes of the work and tool nearer together or farther apart is necessary except for setting purposes. Cams or other mechanism for feeding the work towards the tool or for feeding the cutting tool towards the work are thus obviated. The sliding carriage carrying the work and the sliding carriage carrying the cutting tool operating mechanism may be rigidly clamped to their respective guides after the initial adjustment for correct cutting depth has been made.

I claim:

1. A gear cutting tool of gear wheel type having a series of peripheral teeth of uniform pitch disposed in a circle concentric with the axis of the tool, and an untoothed peripheral portion, said series comprising a set of similar teeth preceded by one or more teeth of different dimensions, and the number of teeth in said set being at least equal to the number of teeth to be formed on the gear which is produced by the tool.

2. A gear cutting tool of gear wheel type having a series of peripheral teeth of uniform pitch disposed in a circle concentric with the axis of the tool, and an untoothed peripheral portion, said series comprising a set of similar teeth preceded between the set and said untoothed portion by a plurality of teeth of progressively increasing dimensions, and the number of teeth in said set being at least equal to the number of teeth to be formed on the gear which is produced by the tool.

WALTER HENRY TRY.